(12) United States Patent
Diab

(10) Patent No.: US 8,493,843 B2
(45) Date of Patent: Jul. 23, 2013

(54) SYSTEM AND METHOD FOR USING AN ALTERNATIVE WIRE PAIR FOR COMMUNICATION ON INITIAL WIRE PAIR FAILURE

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 727 days.

(21) Appl. No.: 12/209,243

(22) Filed: Sep. 12, 2008

(65) Prior Publication Data

US 2010/0067372 A1   Mar. 18, 2010

(51) Int. Cl.
*H04L 12/811* (2013.01)
(52) U.S. Cl.
USPC ............................ 370/228; 370/216; 370/217
(58) Field of Classification Search
USPC .................................................. 370/216, 228
See application file for complete search history.

(56) References Cited

U.S. PATENT DOCUMENTS

| | | | |
|---|---|---|---|
| 2003/0095505 A1* | 5/2003 | Wells et al. | 370/242 |
| 2003/0126851 A1* | 7/2003 | Noel et al. | 57/59 |
| 2004/0117674 A1* | 6/2004 | Gutman et al. | 713/300 |
| 2004/0153848 A1* | 8/2004 | Cromer et al. | 714/43 |
| 2005/0021734 A1* | 1/2005 | Chan | 709/224 |
| 2005/0165959 A1* | 7/2005 | Huff | 709/238 |
| 2007/0041314 A1* | 2/2007 | Levi et al. | 370/216 |
| 2007/0192505 A1* | 8/2007 | Dalmia | 709/233 |
| 2008/0049788 A1* | 2/2008 | McClellan | 370/468 |

* cited by examiner

*Primary Examiner* — Michael Thier
*Assistant Examiner* — Brian Cox
(74) *Attorney, Agent, or Firm* — Duane S. Kobayashi

(57) ABSTRACT

A system and method for using an alternative wire pair for communication on initial wire pair failure. Upon detection of a failure in a wire pair, an alternative set of one or more wire pairs can be used to support the Ethernet communication. In one embodiment, the alternative wire pairs are kept in a hot standby mode to enable almost instantaneous switching. In another embodiment, an enhanced autonegotiation process is used to automatically identify the alternative set of wire pairs that can support the Ethernet communication.

17 Claims, 4 Drawing Sheets

ENHANCED AUTONEGOTIATION PROCESS EXAMPLE

SYSTEM AND METHOD FOR USING AN ALTERNATIVE WIRE PAIR FOR COMMUNICATION ON INITIAL WIRE PAIR FAILURE

BACKGROUND

1. Field of the Invention

The present invention relates generally to Ethernet systems and methods and, more particularly, to a system and method for using an alternative wire pair for communication on initial wire pair failure.

2. Introduction

Conventional physical layer devices (PHYs) can support a variety of transmission rates. For example, a triple-speed PHY can be designed to support 1 Gbit/s, 100 Mbit/s and 10 Mbit/s operation modes. Here, 1 Gbit/s operation mode would require the use of four wire pairs, while the 100 Mbit/s and 10 Mbit/s operation modes would require the use of two wire pairs. As would be appreciated, quad-speed PHYs can also be designed to support 10 G or higher operation modes.

Upon startup, a pair of devices would use an autonegotiation procedure to choose common transmission parameters, such as speed and duplex mode. In this process, a connected pair of devices would each declare its capabilities. The two devices would then choose the best possible mode of operation that is shared by the two devices. With respect to speed, the two devices would typically choose the highest speed supported by both devices. For example, if both devices are triple-speed PHYs, then the autonegotiation process could settle on 1 Gbit/s as the chosen mode of operation.

Once the link has been established, one of the concerns in network management is failure recovery. As Ethernet links can use four wire pairs, a failure in any of the four wire pair communications can disrupt Ethernet link operation. Detecting and responding to such failures is therefore a key element in providing maximum network efficiency and integrity. What is needed therefore is a mechanism that enables the Ethernet system to account for failures in an active manner during system operation.

SUMMARY

A system and/or method for using an alternative wire pair for communication on initial wire pair failure, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Network availability is critical. This is true in various enterprise, service provider, industrial, commercial, and residential environments. One of the key elements of network management is therefore the detection and handling of network failures. Various failure recovery protocols can be defined in relation to a given network topology. For example, point-to-point network redundancy can be established using hot standby pairs. In another example, ring network topologies can be implemented to assure that traffic can be rerouted around a particular failure. The speed of recovery from a failure is a key element of any network management solution.

For an Ethernet link, a wire pair failure can produce significant network disruption. For example, a single wire pair failure can bring down a four wire pair 10 Gbit/s link for the length of time it takes to alert, troubleshoot, and manually reconnect the two devices with a new Ethernet cable. In the present invention, it is recognized that alternative wire pairs can play a key role in restoring communication between two devices that experience a wire pair failure in the cable between them.

Figure 1:
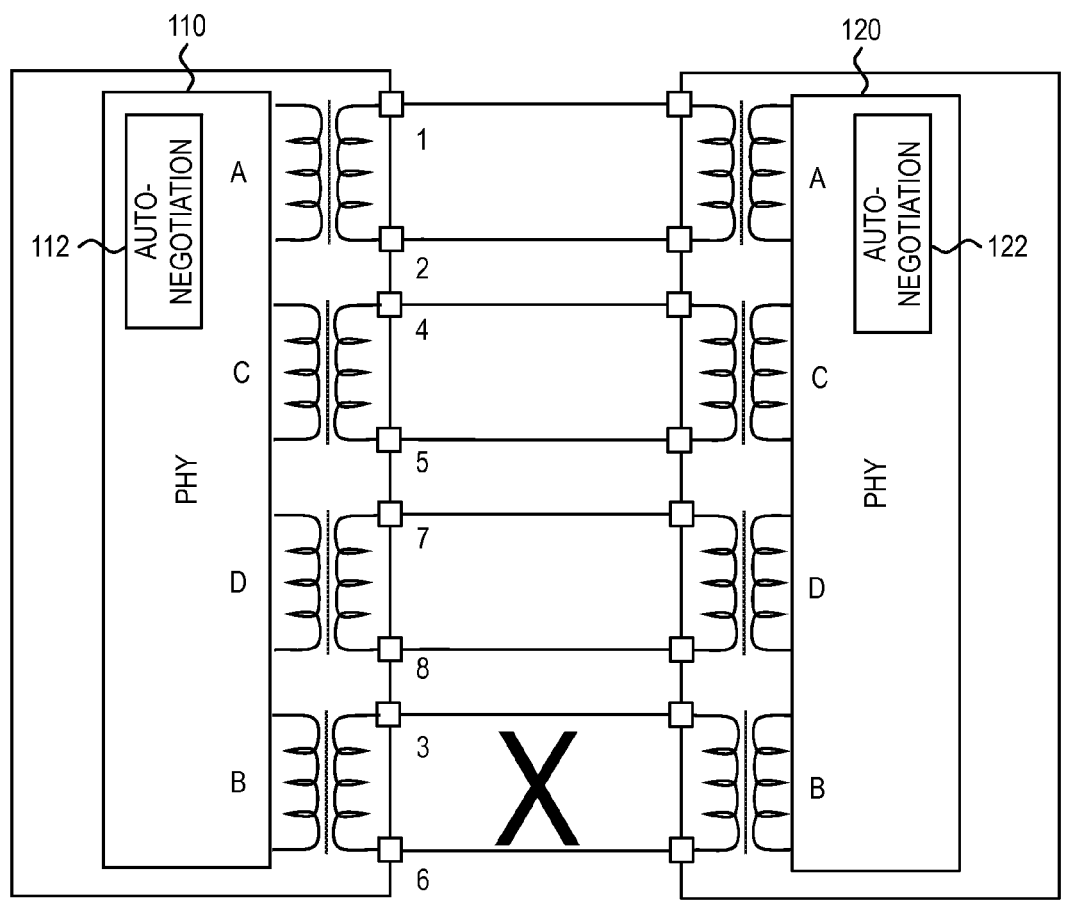
FIG. 1 illustrates an example of a an Ethernet link.

To illustrated the features of the present invention, reference is made first to the example connection illustrated in FIG. 1. As illustrated, a pair of devices are typically connected using a four wire pair Ethernet cable. These four wire pairs are designated as wire pairs A, B, C, and D, which correspond to pins (1, 2), (3, 6), (4, 5) and (7, 8), respectively. The four wire pairs A, B, C, D are coupled to PHYs 110 and 120 at the ends of the link using two sets of transformers.

In establishing an Ethernet connection, autonegotiation modules 112 and 122 would use an autonegotiation procedure to identify the highest speed supported by both devices. For example, the autonegotiation process could seek to establish in a descending order of preference, communication at a 1 Gbit/s, a 100 Mbit/s, or a 10 Mbit/s link rate.

For a 1 Gbit/s link rate, all four wire pairs A, B, C, D would be used. Conversely, if a 100 Mbit/s or 10 Mbit/s link rate is established, only the two primary wire pairs A, B would be used. The remaining two wire pairs C, D are referred to as the alternative wire pairs.

Once the Ethernet link has been established, network management is then responsible for identifying and recovering from an initial wire pair failure. In the illustration of FIG. 1, an example wire pair failure is illustrated as occurring on primary wire pair B. A failure in primary wire pair B would result in a complete failure of the Ethernet link. This results because 10/100 Mbit/s communication would use wire pairs A and B, while 1 Gbit/s communication would use wire pairs A, B, C, and D.

In a conventional system, the failure of wire pair B would disrupt the communication and necessitate the manual replacement of the four wire pair cable connecting the two end devices. This manual process is time consuming and therefore expensive from a network management perspective.

In the present invention, such a failure of an initial wire pair would not require a manual replacement of the four wire pair cable. Rather, a condition produced by a failure of an initial wire pair could be addressed from a recovery perspective using an alternative wire pair. In this manner, communication between the two end devices can resume using a remaining set of wire pairs in the existing Ethernet cable. Such a recovery process would therefore drastically reduce the time it takes to restore connectivity between the two end devices.

Figure 2:
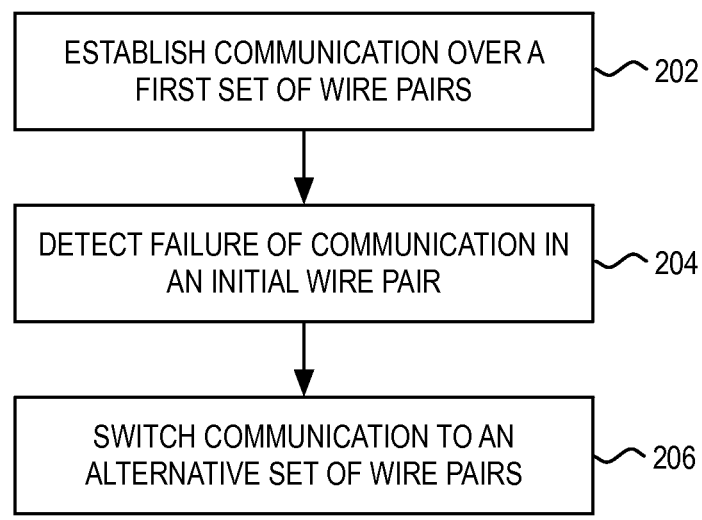
FIG. 2 illustrates a flowchart of a process of the present invention.

To illustrate the features of the present invention, reference is now made to the flowchart of FIG. 2. As illustrated the process begins at step 202 where communication between two devices is established using a first set of wire pairs. In one example, the first set of wire pairs can represent two wire pairs (e.g., A and B), which can support a 10/100 Mbit/s link rate. In another example, the first set of wire pairs can represent four wire pairs (i.e., A, B, C, and D), which can support a 1 Gbit/s link rate.

Next, at step 204, a failure is detected in one of the initial wire pairs. As would be appreciated, the failure in one of the initial wire pairs can be detected in a variety of ways. For example, the failure can be detected based on a change in bit error rate, packet error rate, link status, link energy, or some other diagnostic measure (e.g., time domain reflectometry).

Based on the detected failure in an initial wire pair, the process would then continue to step 206, where the Ethernet communication would be switched to an alternative set of wire pairs. The particular wire pairs included in the alternative set can vary. To illustrate some of the possibilities, consider the example illustrated in FIG. 1 where a failure occurred in wire pair B.

If the link initially operated at 1 Gbit/s, then all four wire pairs (A, B, C, D) would have been used initially. Upon a failure of wire pair B, communication at a 1 Gbit/s link rate would not be possible as only three wire pairs (A, C, D) remain operable. In recovering from the failure of wire pair B, the end devices can choose to lower the link rate to 10/100 Mbit/s, which requires only two wire pairs. In effect, the failure recovery would include a change of the link rate along with an identification of a set of wire pairs that can accommodate the lower link rate communication.

It should be noted that as the initial communication by the PHYs at 1 Gbit/s used all four wire pairs, the PHYs inherently knew that at least two wire pairs would be available upon a failure in an initial wire pair. This results since the two wire pairs that were subsequently selected for 10/100 Mbit/s communication were previously in use, pending a reconfiguration. This is in contrast to other failure recovery systems that rely on active standby links.

Returning to the example of FIG. 1, another possibility is that wire pairs A and B were used initially to support a 10/100 Mbit/s link rate. Upon a failure of initial wire pair B, the end devices could then choose to maintain the link rate, but switch the communication to alternative wire pairs. In one embodiment, initial wire pair A is retained in the set of alternative wire pairs. In another embodiment, the set of alternative wire pairs is mutually exclusive of the initial wire pair set. In other words, the communication is switched from initial wire pairs A and B to alternative wire pairs C and D.

Here, it should be noted that the PHYs in the end devices would need to confirm the existence of alternative wire pairs C and D prior to switching. This results since an initial communication at a link rate of 10/100 Mbit/s need only require two wire pairs between the two end devices. As such, the end devices would first need to detect if the other alternative wire pairs are present. Their existence cannot be assumed as the wiring within a single cable need not be connected to the same set of PHYs.

In one embodiment, the switching of the Ethernet communication to an alternative set of wire pairs can be performed as part of an enhanced autonegotiation process. A conventional autonegotiation process would seek to establish a link rate based on a search in a descending order of preference (e.g., 1 Gbit/s, 100 Mbit/s, 10 Mbit/s). In this conventional autonegotiation process, it is assumed that the 10/100 Mbit/s link rates are supported by the primary wire pairs.

Figure 3:
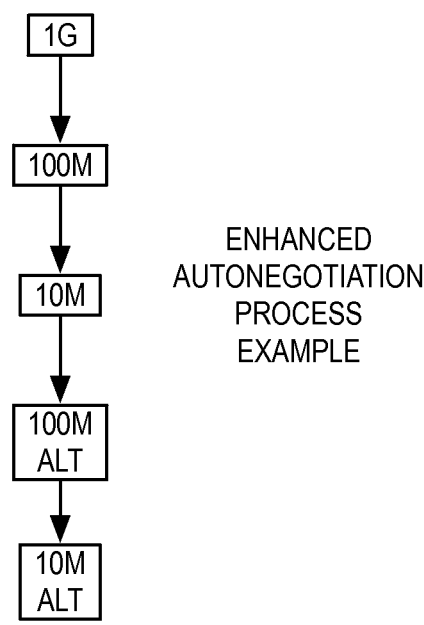
FIG. 3 illustrates an example of an enhanced autonegotiation process.

In accordance with the present invention, an enhanced autonegotiation process can be defined where the negotiation sequence considers different sets of wire pairs in addition to the varying link rates. FIG. 3 illustrates an example of such an enhanced autonegotiation sequence. In this example, the autonegotiation sequence would progress through the various operating modes as follows: 1 Gbit/s, 100 Mbit/s (primary pair), 10 Mbit/s (primary) pair, 100 Mbit/s (alternative pair), then 10 Mbit/s (alternative pair). As this example sequence illustrates, a pre-failure autonegotiation would end in one of the first three modes (i.e., 1 Gbit/s, 100 Mbit/s (primary pair), or 10 Mbit/s (primary pair)), while a post-failure autonegotiation would result in one of the last two modes (i.e., 100 Mbit/s (alternative pair) or 10 Mbit/s (alternative pair)). By this enhanced autonegotiation sequence, an Ethernet communication can quickly re-establish communication between the two end devices without requiring manual intervention. As would be appreciated, this type of progression in examining the availability of different operating modes can be used by other network recovery tools at different layers as part of an automated network management process. System reporting to network management personnel can also be tied to such a detection/switching process.

In one embodiment, the detection and subsequent reporting of a failure in an initial wire pair can lead to a manual specification of a recovery scenario. In another embodiment, one or more alternative wire pairs can be kept in a hot standby mode. This hot standby mode would enable communication to be reestablished almost instantaneously on a "hot wire pair" without going through a full autonegotiation and linkup events. As would be appreciated, dropping the link also has significant implication on upper layers.

To illustrate this embodiment, consider again the scenario of FIG. 1 where the initial operating mode is a 1 Gbit/s link rate. The four wire pairs (A, B, C, D) are each active in supporting the 1 Gbit/s link rate. Notwithstanding their active state in the initial operating mode, the four wire pairs are also effectively in a hot standby mode for a 10/100 Mbit/s operating mode that could be entered into upon detection of a wire pair failure. Thus, where a failure in wire pair B is detected, two hot standby wire pairs (e.g., wire pairs C and D) could almost instantaneously be reestablished to support a 10/100 Mbit/s link rate. In this scenario, the 10/100 Mbit/s operating mode can be configured as a subset operating mode of the 1 Gbit/s operating mode. This subset PHY technique enables rapid switching between modes as it obviates the need for reacquiring settings for the cancellers (e.g., echo, near end crosstalk, far end crosstalk, etc.).

Alternatively, where the initial operating mode is a 10/100 Mbit/s link rate that uses only two wire pairs A and B, the alternative wire pairs C and D can be kept in a hot standby mode where no traffic is being carried. Upon a detection of a failure in wire pair A or B, the 10/100 Mbit/s link rate can be reestablished on wire pairs C and D almost instantaneously.

Figure 4:
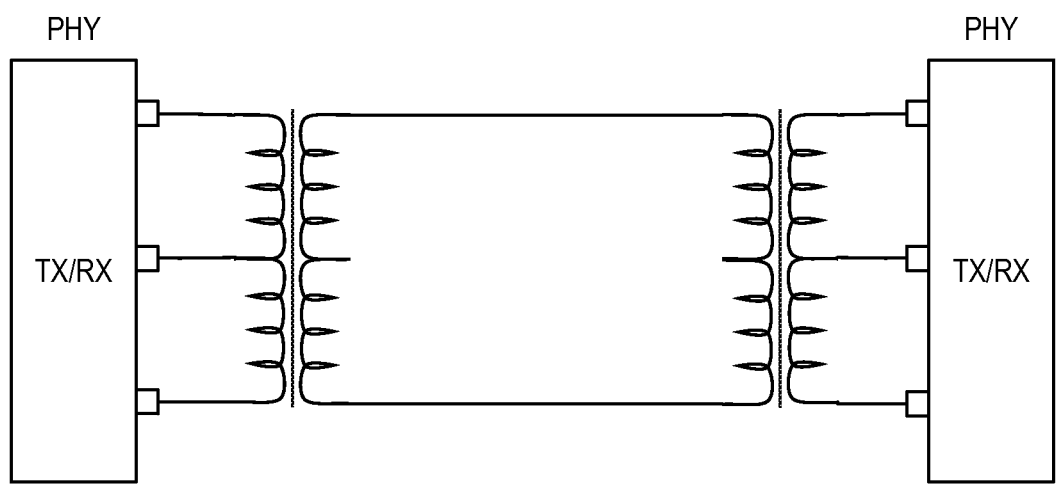
FIG. 4 illustrates an example of single wire pair communication.

In one embodiment, the principles of the present invention can also be applied to systems that can communicate over a single wire pair (see FIG. 4). With this communication option, a system can have an initial operating mode using two wire pairs, then switch to single wire pair operation upon detection of a failure. Alternatively, the system can have an initial operating mode that uses one wire pair, then switch to a second wire pair upon detection of a failure of the first wire pair.

As has been described, a network management process for recovering from initial wire pair failures can be based on the existence of alternative wire pairs. These alternative wire pairs need not be dedicated for failure recovery, but can be used in a pre-failure operating configuration.

It should be noted that the principles of the present invention can be applied to any form of network cabling, whether standard Ethernet cabling (e.g., Category 3, 5, 5e 6, 6A, 7, 7A, etc. and their ISO versions Class C, D, E, etc.) or to non-standard cabling such as Type-II cabling. It should also be noted that the principles of the present invention can be broadly applied to various contexts, such as in all types of PHYs (e.g., backplane, twisted pair, optical, etc.). Moreover, the principles of the present invention can be applied to standard or non-standard (e.g., 2.5G, 5G, etc.) link rates, as well as future link rates (e.g., 40G, 100G, etc.). Also, the principles of the present invention can be applied to various two-pair and four-pair PoE applications.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. An autonegotiation method that enables an identification of a new communication operating mode over an Ethernet link having four wire pairs, comprising:
   detecting a failure of communication in one of the four wire pairs in the Ethernet link, while operating in a first communication operating mode having a first link rate;
   upon said detection, running an autonegotiation process that identifies a second communication operating mode over the Ethernet link, said autonegotiation process identifying said second communication operating mode through an examination of a set of a plurality of possible communication operating modes in a pre-defined sequential order, at least two of said plurality of possible communication operating modes having the same link rate but using two different sets of wire pairs, wherein said pre-defined sequential order includes a sequential transition from a lower link rate to a higher link rate; and
   changing a speed of communication on the Ethernet link from said first link rate to a second link rate, said second link rate being lower than said first link rate, wherein the communication on the Ethernet link at said second link rate uses only two wire pairs.

2. The method of claim 1, wherein said detecting comprises determining a bit error rate, packet error rate, link status, link energy, or a cable diagnostic.

3. The method of claim 1, wherein said first link rate is 1 Gbit/s or 10 Gbit/s.

4. The method of claim 3, wherein said second link rate is 100 or 10 Mbit/s.

5. The method of claim 1, wherein said first link rate is 40 Gbit/s, 100 Gbit/s or higher.

6. The method of claim 1, wherein said second link rate is 2.5 Gbit/s.

7. The method of claim 1, wherein said changing comprises changing said speed of communication to said second link rate, said second link rate being defined for said identified second communication operating mode.

8. An Ethernet method that enables a recovery of a failure in an Ethernet link between a first physical layer device and a second physical layer device, wherein four wire pairs are available between the first physical layer device and the second physical layer device, comprising:
   running a first autonegotiation process that establishes a first communication operating mode between the first physical layer device and the second physical layer device at a first link rate over a first set of wire pairs;
   detecting a failure of communication in one of the wire pairs in said first set of wire pairs; and
   upon said detection, automatically running a second autonegotiation process that establishes a second communication operating mode between the first physical layer device and the second physical layer device over a second set of wire pairs, said second autonegotiation process identifying said second communication operating mode through an examination of a set of a plurality of possible communication operating modes in a pre-defined sequential order, at least two of said plurality of possible communication operating modes having the same link rate but using two different sets of wire pairs, wherein said pre-defined sequential order includes a sequential transition from a lower link rate to a higher link rate.

9. The method of claim 8, wherein said second autonegotiation process establishes communication at a second link rate different than said first link rate.

10. The method of claim 9, wherein said first link rate is 1 Gbit/s or greater and said second link rate is 100 Mbit/s or less.

11. The method of claim 8, wherein said first set of wire pairs and said second set of wire pairs are mutually exclusive.

12. The method of claim 8, wherein said first set has four wire pairs and said second set has two wire pairs.

13. The method of claim 8, wherein said first set has two wire pairs and said second set has one wire pairs.

14. An autonegotiation method, comprising:
   detecting a failure of communication in one of four wire pairs in an Ethernet link, while operating in a first communication operating mode having a first link rate;
   upon said detection, running an autonegotiation process that identifies a second communication operating mode over the Ethernet link, said autonegotiation process identifying said second communication operating mode through an examination of a set of a plurality of possible communication operating modes in a pre-defined sequential order, at least two of said plurality of possible communication operating modes having the same link rate but using two different sets of wire pairs.

15. The method of claim 14, wherein said detecting comprises determining a bit error rate, packet error rate, link status, link energy, or a cable diagnostic.

16. The method of claim 14, wherein said first link rate is 1 Gbit/s or 10 Gbit/s.

17. The method of claim 14, wherein said first link rate is 40 Gbit/s, 100 Gbit/s or higher.

* * * * *